(12) United States Patent
Salyer et al.

(10) Patent No.: US 6,192,703 B1
(45) Date of Patent: *Feb. 27, 2001

(54) INSULATING VACUUM PANEL, METHOD FOR MANUFACTURING THE INSULATED VACUUM PANEL AND INSULATED CONTAINERS EMPLOYING SUCH PANEL

(75) Inventors: Ival O. Salyer, Dayton; Nicholas Wynne, Hilliard, both of OH (US)

(73) Assignee: Vacupanel, Inc., Xenia, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/395,690

(22) Filed: Sep. 13, 1999

Related U.S. Application Data

(63) Continuation-in-part of application No. 08/662,784, filed on Jun. 12, 1996, now Pat. No. 5,950,450.

(51) Int. Cl.[7] .................................................... F25D 3/08
(52) U.S. Cl. ............................................. 62/457.7; 62/371
(58) Field of Search .................................. 62/457.7, 371

(56) References Cited

U.S. PATENT DOCUMENTS

| | | |
|---|---|---|
| 4,162,341 | 7/1979 | Norton . |
| 4,632,645 | 12/1986 | Kawakami et al. . |
| 4,706,470 | 11/1987 | Akazawa et al. . |
| 4,726,974 | 2/1988 | Nowobiliski et al. . |
| 4,821,914 | 4/1989 | Owen et al. . |
| 5,035,122 | 7/1991 | Oogjen . |
| 5,082,335 | 1/1992 | Cur et al. . |
| 5,106,520 | 4/1992 | Salyer . |
| 5,252,408 | 10/1993 | Bridges et al. . |
| 5,282,994 | 2/1994 | Salyer . |
| 5,379,596 | 1/1995 | Grayson . |
| 5,505,046 | 4/1996 | Nelson et al. . |
| 5,512,345 | 4/1996 | Tsutsumi et al. . |
| 5,522,216 | 6/1996 | Park et al. . |
| 5,918,478 | * 8/1999 | Bostic et al. ............................. 62/371 |
| 5,943,876 | * 8/1999 | Meyer et al. ............................ 62/371 |
| 5,950,450 | * 9/1999 | Meyer et al. ........................ 62/457.9 |
| 6,032,474 | * 3/2000 | Dale et al. ............................... 62/239 |

FOREIGN PATENT DOCUMENTS 2232756    12/1990   (GB) .

OTHER PUBLICATIONS

VAXICOOL Transport and Storage Refrigerator, VacuPanel, Inc. (1993) brochure.

* cited by examiner

Primary Examiner—William Doerrler
Assistant Examiner—Mark Shulman
(74) Attorney, Agent, or Firm—Thompson Hine & Flory LLP

(57) ABSTRACT

An insulating vacuum panel comprising a microporous, open cell silica foam or a precipitated silica insulating support member enclosed within a sealed, flexible polymeric envelope, the envelope comprising a heat-sealable barrier film comprising a multiple layer laminate containing at least one polyethylene terephthalate layer and at least two barrier layers selected from the group consisting of polyvinylidene chloride, polyvinyl alcohol, polyamide, polyolefin and aluminum foil, or a biaxially oriented liquid crystal barrier film which minimizes permeation of gas and liquid through the barrier film, the panel having an R value per inch of at least about 20 wherein the enclosed insulated vacuum panel is useful as insulation to maintain an essentially constant temperature in a closed structure, a system for storing and transporting temperature-sensitive materials wherein the insulated vacuum panels are employed to provide and maintain a constant temperature in the system, a method for manufacturing the insulating vacuum panel, and a system for storing and transporting temperature-sensitive materials are described.

41 Claims, 4 Drawing Sheets

MELTING POINT VS. CARBON CHAIN LENGTH OF STRAIGHT CHAIN ALKYL HYDROCARBONS, DETERMINED BY DIFFERENTIAL SCANNING CALORIMETRY, AT 2° C/MIN. RATE OF HEATING AND COOLING

INSULATING VACUUM PANEL, METHOD FOR MANUFACTURING THE INSULATED VACUUM PANEL AND INSULATED CONTAINERS EMPLOYING SUCH PANEL

This is a continuation-in-part of U.S. application Ser. No. 08/662,784, filed Jun. 12, 1996, now U.S. Pat. No. 5,950,450.

BACKGROUND OF THE INVENTION

1. Field of the Invention

This invention relates to an improved insulating vacuum panel, a method for manufacturing such insulating vacuum panel, and to a portable refrigerator unit and storage container employing such insulating vacuum panels useful for the transport and storage of temperature-sensitive materials such as body organs, vaccines, antibodies, etc., for long periods of time in locations which lack conventional sources of electrical power. Advantageously, the insulated vacuum panel also contains a phase change material (PCM) in the form of a PCM/silica gel, a PCM/silica dry powder, or a PCM/HOPE/EVA/silica melt mix.

2. Prior Art

In many developing countries, particularly in tropical and desert climates, there is a lack of sufficient refrigeration systems and, in many instances, there are no power capabilities to operate such refrigeration systems even if they were available.

The prior art systems available are based on refrigerator systems that freeze water to provide thermal storage temperatures of 0° C. or below. Exposure of temperature-sensitive medicinals such as vaccines, etc., to these low temperatures frequently results in irreversible damage due to freezing of water which is an essential component to many of these medicinal products. On the other hand, storage of the medicinals at temperatures greater than about 10° C. can also cause irreversible damage to the medicinals. Thus, there is an urgent need for a portable refrigerator system that operates to maintain the temperature within a narrow band above 0° C. and below 10° C. and which can operate where conventional electrical power lines are not available.

SUMMARY OF THE INVENTION

In one aspect of the invention there is described an evacuated insulating panel suitable for use in insulating various structures where it is desirable to maintain the interior temperature of the structure at a constant temperature plateau which is different from the temperature outside the structure, such as walls of houses, hotels, motels, office buildings, factories, and warehouses, etc.; appliances such as hot water heaters, ovens, refrigerators, shipping containers, recreational containers such as coolers for carrying drinks and food, heated pouches for hot food deliver, e.g., pizza, Meals-On-Wheels, etc., and cooled pouches for cool or cold food delivery, e.g., dairy or frozen food products; roof panels, side panels and doors of motor vehicles such as cars, buses, trucks, trains, planes, etc.; heating and cooling ducts; and refrigerated cargo areas in trucks, railroad cars, ships, etc. In a particularly preferred manifestation of the invention, the present insulation panels are employed in portable containers for storing and transporting temperature-sensitive materials such as medicinals, e.g., vaccines to remote locations which lack adequate means for providing conventional refrigeration.

In another aspect of the invention, there is described a method for manufacturing the insulating panels.

In yet another aspect of the invention, a portable insulated system is described for storing and transporting temperature sensitive materials at a prescribed temperature for a prolonged period of time. In one embodiment, the system comprises a portable refrigerator unit which comprises a compressor, a source of electrical power, a battery for storing electrical energy from the power source, a housing which provides a low rate of heat transfer, and a thermal energy storage phase changes material which operates at a constant temperature plateau. In another embodiment, the system comprises a highly insulated, light weight, portable container and the phase change material. The refrigerator unit is particularly useful in storing and transporting the temperature-sensitive material to a central location which is remote from any source of energy for conveniently providing power to a conventional refrigeration unit. At this central location, the temperature-sensitive materials can be transferred from the portable refrigerator unit to one or more highly insulated, light weight portable containers along with the thermal energy storage phase change material to maintain the temperature while they are transported to various other remote locations.

This system satisfies an urgent need of the World Health Organization for preservation, storage, and transport of medicinals that is especially valuable in tropical and desert climates in developing countries, where the absence of such capabilities often results in deterioration of the medicinals to the extent that they cannot provide the expected treatment. In vaccines, this may result in vaccinations that are ineffective, or, in some cases, actually harmful when used. The present invention also provides the added advantage of eliminating the energy demand needed to freeze water.

DETAILED DESCRIPTION OF THE INVENTION

Figure 1:
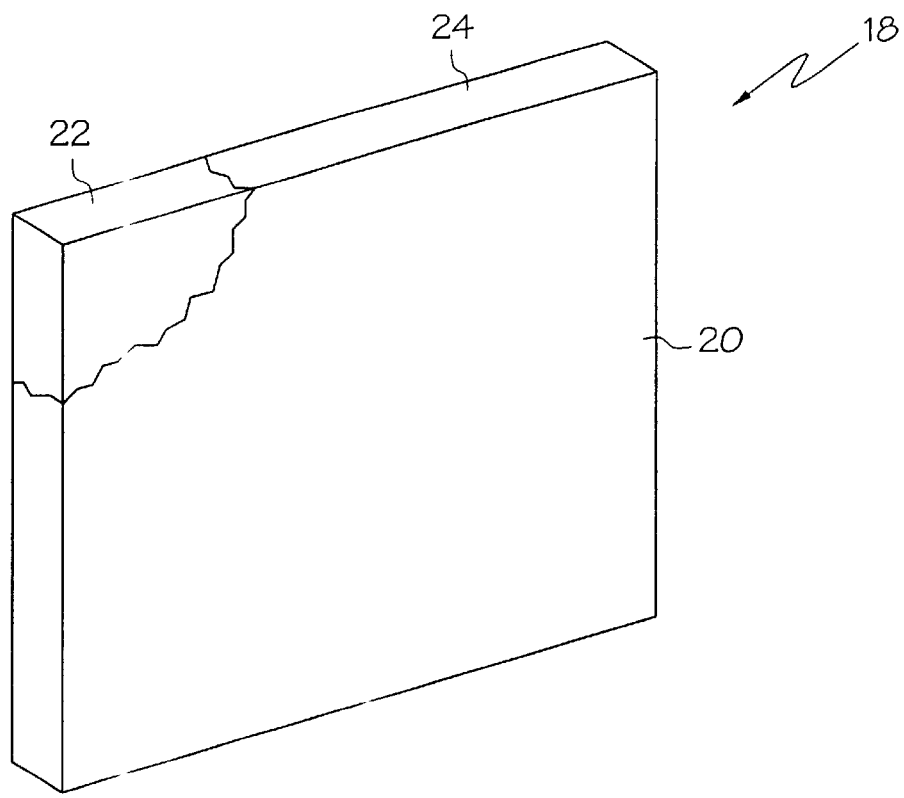
FIG. 1 is a perspective view of the insulating vacuum panel of the present invention in which the envelope has been cut away to show the insulating support member.

The present invention relates to a highly efficient evacuated insulating panel. As illustrated in FIG. 1, the insulating panel 18 preferably includes an envelope 20 which encloses an insulating support member 22. The insulating panel-containing envelope is evacuated to provide an internal pressure of less than about 5 torr, preferably, about 0.5 to 3 torr depending on the desired use of the insulating panel. In a preferred aspect, the evacuated insulating panel 18 is provided with a re-entry port(not shown)through which the panel can be re-evacuated if necessary. The insulating panels of the present invention can be used in any application where insulation is desired. For example, the insulating panels can be used in the building construction field to provide insulation in the ceilings and walls of houses, office buildings, hotels, motels, factories, warehouses, etc. They can also be efficiently used in common appliances such as refrigerators, stoves, hot water heaters, motor vehicles, heating and cooling ducts, etc. The evacuated insulating panels of the invention are particularly effective for providing the insulating characteristics and properties necessary in portable refrigerator units and highly insulated containers which allow the safe storage and transportation of medicinals such as vaccines, anti-bodies, etc., world wide, even in the most remote areas of the world.

The insulating vacuum panels of the present invention can be manufactured in accordance with the following steps which comprise:

(a) providing an insulating support member of the desired shape and size;

(b) drying the insulating support member;

(c) enclosing the insulating support member in a flexible, heat-sealable, polymeric film pre-formed in the shape of an envelope;

(d) evacuating the insulating support member-containing envelope; and (e) heat sealing the opening.

In a preferred aspect of the invention where the insulating vacuum panel contains a re-entry port for evacuating or re-evacuating the panel, the above steps (d) and (e) may be reversed. As an alternative to using a pre-formed envelope as in step (c), the insulating support member can be placed between two sheets of the flexible, heat-sealable, polymeric-film used to enclose the insulating support member and the peripheral edges of the film are heat-sealed to form the enclosed insulating support member. It will also be recognized by those skilled in the art that the insulating support member can be placed on a single sheet of the flexible, heat-sealable, polymeric film and the film can be folded over the insulating support member such that only three of the peripheral edges of the film need to be heat sealed to form the enclosed, insulating support member. Furthermore, where the insulated vacuum panels are used in the housing structures of the refrigeration unit and the portable insulated container, the panels can be manufactured in the form of a tray. For example, a first envelope or bag comprising the flexible, heat-sealable, polymeric film and having the shape and size conforming to the interior of the housing can be placed in the housing followed by placing the insulating support members in the envelope or bag so that they form a bottom and sides which conform to the interior of the housing, a second envelope or bag is then inserted into the housing such that the insulating support members are disposed between the two envelopes or bags, the top peripheral edges of the two bags are heat-sealed together and evacuated to form a sealed insulated vacuum panel in the form of a tray which defines the interior of the housing.

The refrigerator unit is typically used along with a separate light weight, highly insulated portable container to safely store and transport temperature-sensitive materials such as vaccines and anti-bodies to remote areas such as tropical and desert developing countries in Africa and elsewhere. Prior to the present invention there has been no effective way to safely store and transport these temperature-sensitive materials to such remote places. Previous attempts to provide these medicinals to people in underdeveloped countries, particularly in those countries which experience extreme heat have proven to be inefficient.

The refrigeration unit of the present invention is particularly useful to store and transport the temperature-sensitive material to a centralized remote site where it can maintain the temperature-sensitive material at a constant temperature for prolonged period of time. The highly insulated light weight containers, which may be used in conjunction with the refrigerator unit, can then be loaded with the temperature-sensitive materials along with the thermal energy storage phase change material and easily transported to various other areas which may be inaccessible or difficult to reach with the heavier and bulkier refrigerator unit.

In one aspect of the invention, the highly insulated, light weight container of the present invention includes a housing which contains top, bottom and side insulating panels, which define the interior of the container for storing the temperature-sensitive material. The container further includes an openable lid which provides access to the interior of the container.

While any material can be employed to construct the outer shell of the refrigerator unit and the highly insulated, light weight container of the invention, polymeric materials such as polyolefin, e.g., polyethylene, polypropylene, etc. are particularly preferred because of their durability and light weight.

In a particularly preferred aspect of the invention, the portable refrigerator unit of the present invention includes:

(1) an energy source for supplying direct current (DC) power to the system;

(2) a battery for storing the direct current electrical power and supplying continuous DC power to the unit whether the energy source is operating or not;

(3) a compressor unit for cooling the container system;

(4) a closable compartment for holding temperature-sensitive materials; and (5) a thermal energy storage phase change material which supplies a plateau of constant prescribed temperature.

Figure 2:
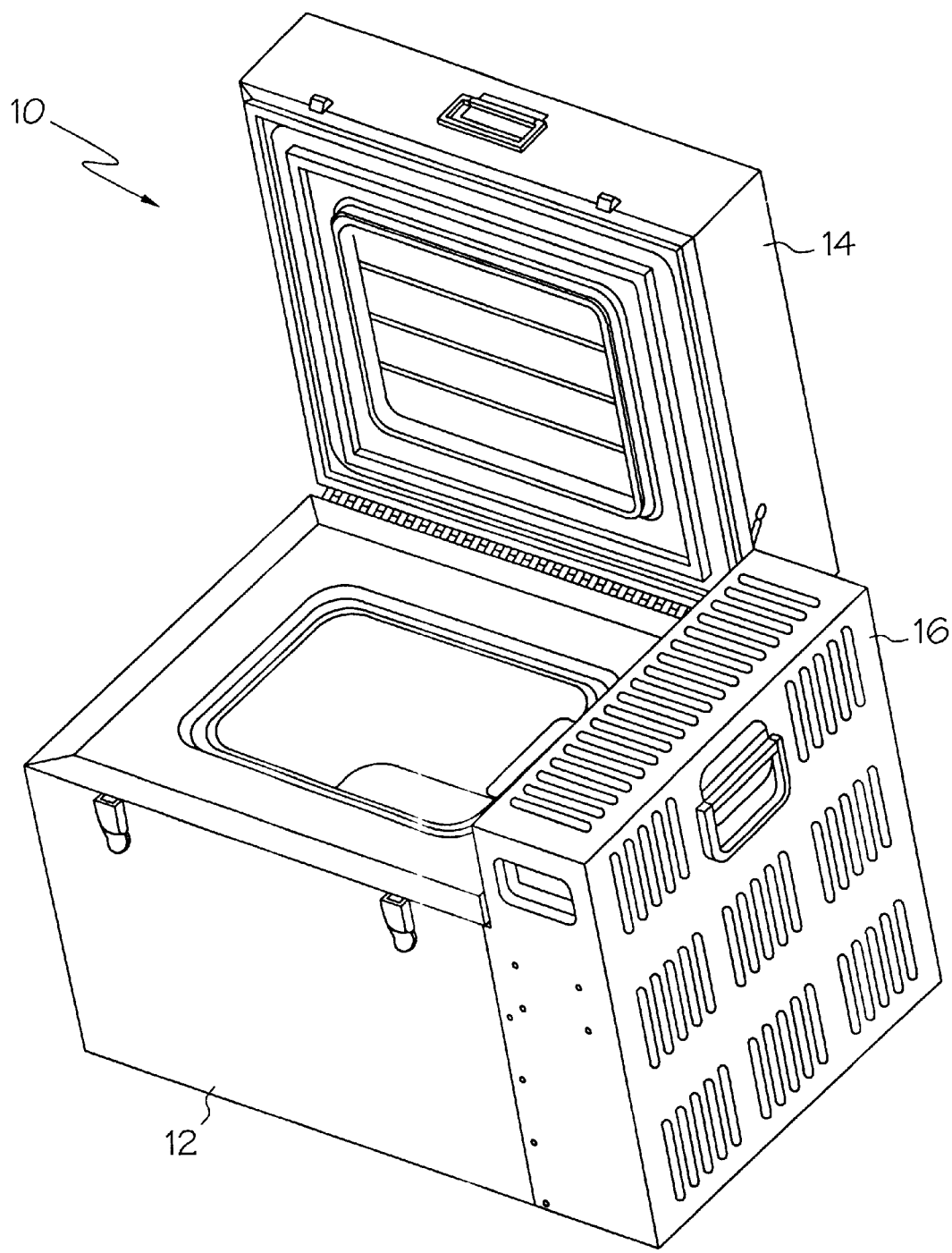
FIG. 2 is a perspective view of the self-sustained refrigeration unit of the present invention.

As illustrated in FIG. 2, the refrigerator unit system 10 consists of a housing 12 including a lid assembly 14, and insulating vacuum panels 18. A refrigeration unit 16 is provided as an integral part of the container system 10. The refrigerator unit 16 includes a compressor unit (not shown) which employs a compressible vapor component which is environmentally friendly, as the refrigerant. Typically, the vapor compressor unit is a swing motor, an electro-dynamic reciprocating device that directly drives the piston of the compressor and normally requires only about 3.2 amperes of current at 12 volts to operate. The internal evaporator of the refrigeration unit absorbs heat from the space inside the insulated container for the refrigerator compressor and stores a significant amount of this heat in the phase change material, which then provides a narrow temperature band width centered at about 3–5° C. for long periods of time when the compressor unit is not operating. Additionally the frozen phase change material can be removed from the refrigerator container unit and placed in a separate vacuum panel insulated container and used to maintain a constant temperature of about 5–8° C. for a long period of time during transport of a temperature sensitive payload.

The need for excessively large and expensive generators is avoided by the use of a low power vapor compressor refrigeration unit, which requires only about 3.5 amperes at 12-volts to operate. This small amount of energy can be sufficient to supply the refrigeration requirement of the system only if the refrigerator unit is highly insulated so that heat loss to the surroundings is minimized. This is made possible by the use of a refrigeration unit contained in a housing comprising evacuated, double wall plastic panels or top, bottom and side panels enclosed within a sealed, flexible polymeric envelope structure wherein said envelope structure comprises a barrier film which minimizes permeation of gas and liquid through the envelope. In a preferred embodiment of the invention, the compressor is connected to the internal evaporator using stainless steel tubing. The use of stainless steel tubing for this purpose provides refrigeration efficiency as compared to the use of conventional copper tubing. It is believed that the heat transfer loss using stainless tubing may be as low as about ⅕ of the loss using copper tubing.

Figure 3:
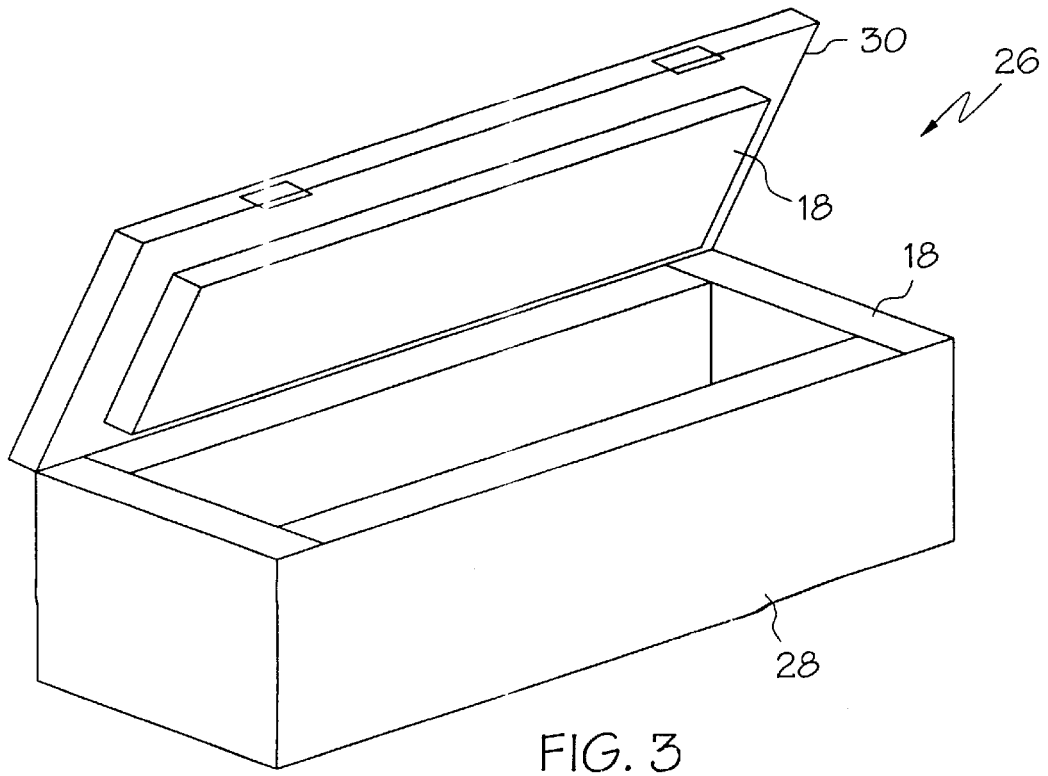
FIG. 3 is a perspective view of the highly insulated, portable container of the present invention useful in conjunction with the refrigerator unit to store and transport temperature-sensitive materials to remote locations.

As illustrated in FIG. 3, the highly insulated, light weight container 26 useful for transporting the temperature-sensitive material to the various remote areas consists of a housing 28 including a lid assembly 30, and insulating vacuum panels 18, a thermal energy storage phase change material (not shown) is employed with the container 26, i.e., it is typically placed in the interior of the container in intimate contact with the temperature material to maintain a constant temperature plateau in the closed interior of the container 26 while it is being transported to the remote areas. The temperature-sensitive materials can be held in the container 26 for a prolonged period of time which can be up to about 6 days or more.

The system comprising a combination of the aforementioned refrigerator unit and the highly insulated, light weight container effectively supplies the need for a reliable, low-cost, stand-alone refrigeration and light weight transport system that can supply a constant temperature of about 3° C.–8° C. for extended periods of time to fill the requirements of the World Health Organization for safe storage and transport of medicinals in developing countries of the world.

In one embodiment of the present invention, the flexible envelope is prepared from a multi-layer film containing at least one layer which exhibits good air ($N_2, O_2$) barrier properties and at least one layer which exhibits good water-barrier properties. One particularly effective polymeric film for use in this embodiment is a co-extruded, multi-layer material which comprises at least one layer of polyethylene terephthalate (PET), at least one layer of polyvinylidene, chloride (PVDC), and at least one layer of polyvinyl alcohol (PVOH). Preferably, at least one of the polyethylene terephthalate layers has an aluminum film coated on at least one surface thereof. A multi-layer barrier film found to be effective for use as the envelope of the present invention typically exhibits a gas (particularly $O_2$ and $N_2$)permeation rate of about 0.00001 CC/24 hours/100 sq. in./mm thickness at atomospheric pressure, 73° C. and 0% RH. Such a film is available from Tennessee Press, Knoxville, Tenn. under the trade name DuPont 153-1.

Another multi-layer film particularly effective in this embodiment is prepared from a flexible multi-layer film containing at least one ethylene-vinyl acetate or polyvinyl acetate layer, at least one polyethylene terephthalate layer, at least one polyvinylidine chloride (PVDC) layer, and at least one polyvinyl alcohol layer, and at least one polyamide layer. Preferably, at least one of the polyethylene terephthalate layers has an aluminum film evaporated on at least one surface thereof and/or an aluminum foil on at least one surface thereof. Such a film is available from Toyo Aluminum KK.

In another embodiment of the present invention, the flexible envelope is a biaxially oriented monolithic liquid crystal polymer (LCP). A particularly preferred biaxially liquid crystal polymer is a wholly aromatic copolyester such as poly(benzoate-naphthoate). Liquid crystal, wholly aromatic copolymer resins are available from Ticona, a member of the Hoechst Group under the trade name Vectra A and Vectra C. The liquid crystal polymers most useful as the envelope material of the present invention should be biaxially oriented in order to provide the necessary flexibility to bend and shape without losing its integrity, i.e., without cracking or breaking.

The oxygen and moisture permeability of a liquid crystal polyester (VECTRA A950) compared with other well known barrier polymer films such as polyethylene terephthalate (PET), high density polyethylene (HDPE), Saran and polyvinylalcohol copolymer as shown in Table 2.

Copending U.S. application Ser. No. 08/662,784, describes container or housing structures for refrigeration and transport systems which employ a double wall plastic panel structure. A list of polymeric materials useful in constructing the vacuum panels with their permeability properties is shown in Table 1.

TABLE 1

| Polymer | Polymer Class | Permeation Rates | | |
|---|---|---|---|---|
| | | Oxygen[1] | $CO_2$[1] | Water[2] |
| VECTOR A950[12] | Copolyester | 0.08 | — | 0.07 |
| Polyvinylidene chloride | Halogen | 0.1 | 0.3 | 0.2 |
| LOPAC[3] | Nitrile | 0.6 | 1.8 | 2.9 |
| BAREX[4] | Nitrile | 1.1 | 3.1 | 6.1 |
| Saran[5] wrap | Halogen | 1.3 | 4.5 | 0.5 |
| Epoxy | Thermoset | 3.0 | 9.0 | 4.0 |
| KEL F (PCTFE) | Halogen | 3.2 | 12.0 | 0.3 |
| TROGAMID T[6] | Polyamide | 4.5 | 12.0 | 5.2 |
| KYNAR[7] PVDF | Halogen | 4.5 | 15.0 | 1.0 |
| Polyethylene Terephthalate | Polyester | 3–10 | 9–35 | 2–4 |
| Nylon 69-Nylon 610 | Polyamide | 5.7 | 12.0 | 6.0 |
| Phenoxy | Condensate | 7.0 | 15.0 | 4.5 |
| PVC (rigid) | Halogen | 8–15 | 20–40 | 2–3 |
| Nylon 6-Nylon 66 | Polyamide | 5.0 | 9.0 | 18.0 |
| DELRIN[8] | Polyacetal | 12.0 | 29.0 | 13.0 |
| Polymethyl Methacrylate | Acrylic | 17.0 | 40.0 | 12.0 |
| Nylon 11 | Polyamide | 26.0 | 64.0 | 4.6 |
| XT Polymer[9] | Acrylic | 20–40 | 60–120 | 10–15 |
| Polyvinyl alcohol | Hydroxyl | 0.01 | 0.03 | 2,000 |
| Cellophane (dry-uncoated) | Cellulosic | 0.13 | 0.3 | 365 |
| High Density Polyethylene | Olefin | 110 | 300 | 0.5 |
| Polypropylene | Olefin | 150 | 450 | 0.5 |
| Teflon[10] | Halogen | 220 | 600 | 0.25 |
| Polybutene | Olefin | 330 | 1,000 | 1.5 |
| Low Density Polyethylene | Olefin | 480 | 1,500 | 1.5 |
| Surlyn[11] | Ionomer | 550 | 2,000 | 2.7 |
| Butyl Rubber | Elastomer | 1,500 | >4,000 | 2.1 |

[1]CC/24 hours/100 sq. in/mil-atmos. and 73° F. (0% RH)
[2]gm/24 hours/100 sq. in/mil-100° F. (100% RH)
[3]A thermoplastic acrylonitrile copolymer sold by Monsanto
[4]A thermoplastic acrylonitrile copolymer sold by BP Chemical
[5]A plasticized thermoplastic polyvinylidene chloride film sold by DOW Chemicals Co.
[6]A clear nylon copolymer sold by HULS America
[7]A polyvinylidene fluoride sold by ELF ATO-CHEM, North America
[8]A thermoplastic acetal resin sold by DuPont
[9]An acrylic polymer sold by CYRO Industries
[10]A polytetrafluoroethylene sold by Dupont
[11]A thermoplastic polyethylene/acrylic acid copolymer sold by Dupont
[12]A wholly aromatic liquid crystal polyester sold by VECTOR.

Both the double wall plastic vacuum panel insulation which comprises at least two panel sheets having a space under vacuum between the sheets and the flexible envelope structure typically uses a support material to support atmospheric pressure on the double wall panels or on the sides of the envelope structure. A typical support is an open cell, microporous silica foam, e.g., a fumed silica foam. Most preferably, the support is a low density, high surface area silica foam having a small pore size of about 5 to 50 nanometers. A particularly preferred silica foam support material is available from Cabot under the trade name Nanogel™. The open cell, microporous silica foam should be capable of supporting atmospheric pressure with little compressive deflection. Typically, the open cell, microporous silica foam, in the form of a slab or sheet, is enclosed in a sealed envelope which is evacuated to a level of about 100 torr or less and is able to maintain the initial evacuated pressure for extended periods of time. The complete vacuum panel can provide insulation values which are 10 times greater than obtained with convention glass wool or foam insulation currently used.

Phase change materials (PCM) are advantageously used in the embodiments of the present invention. Phase change materials undergo a change in their physical form, or state, from a solid-to-liquid and liquid-to-gas, as the temperature is progressively increased from absolute zero. During the phase change from solid-to-liquid and liquid-to-gas, heat is absorbed from the surrounding environment. Conversely, in cooling from gas-to-liquid and liquid-to-solid, heat is evolved to the environment. This heat that is absorbed or evolved in these phase transitions is called latent heat and it can occur over a very narrow range of temperature. The heat that is absorbed or evolved without a change of state is called sensible heat, and occurs over a wide range of temperature to supply significant thermal storage capacity. Over a limited range of temperature (e.g., 10° C.), the latent heat of the solid-to-liquid transition is 5–8 times greater than the sensible heat storage. The difference in thermal storage between latent and sensible heat is even larger in the liquid-to-gas transition.

However, some materials, because of crystallinity, strong intermolecular attraction (e.g., hydrogen bonding), and/or regularity of molecular structure, absorb and evolve much larger amounts of latent heat in going through these changes in physical state. The materials with very high latent thermal energy storage are commonly identified as "phase change materials (PCM)." As pointed out above, materials which undergo energetic phase transitions as a function of temperature can absorb and evolve large amounts of thermal energy in going through the changes of physical state. The liquid-to-gas transition is always much more energetic than the solid-to-liquid transition. However, the liquid-to-gas transition involves very large volume changes, and high pressures, that make these materials undesirable for many applications while uniquely qualifying them for others (e.g., steam turbines). The molecules that comprise phase change material may be either inorganic or organic. Of the inorganic phase change materials, water in its solid-to-liquid transition at 0° C., and liquid-to-gas at 100° C. is one of the most energetic and lowest cost for use at either of its phase change temperatures (0° and 100° C.). The temperature to be maintained depends, of course, on the nature of the temperature-sensitive material and on the selection of the phase change material, and can be adjusted to accommodate temperature sensitive materials within a specific temperature range over a broad temperature range spectrum.

The phase change material preferentially may be selected from a linear crystalline alkyl hydrocarbon of appropriate melting and freezing temperature. However, other phase change materials may also be used in certain instances including organic fatty acids, fatty acid esters, and primary alcohols such as $C_1$–$C_{22}$ primary alcohols, water/CaO, glycol, water/glycol, organic fatty acids, fatty acid esters or mixtures thereof. In applications where temperature control is desired at temperatures of 0° C. or lower the water/silica gels, water/silica dry powders or the lower freezing combinations of water/urea/silica, water/NaCl/silica can be utilized. Obviously, there are many applications, in addition to those listed, that can make effective use of the new combination of microporous open cell silica foam, enclosed in an impermeable composite film envelop and evacuated to pressure of 100 Torr or less. In combination with the phase change material, the system can be used to provide a plateau of nearly constant temperature for protecting temperature-sensitive materials for extended periods of time.

For temperatures from just above 0° C. to 132° C., organic molecules comprised of linear crystalline alkyl hydrocarbons are the most useful and cost effective phase change materials. These linear crystalline alkyl hydrocarbon materials are low cost by-products of petroleum refining, and normally consist of a mixture of three or more carbon chain lengths that store and release about 35 calories/gram in melting and freezing. Ultra pure phase change materials are obtained by special synthesis, or extensive fractionation, have higher thermal energy storage of up to about 60 calories/gram. For example, 98% pure $C_{14}$ tetradecane has a thermal storage capacity of at least about 45 calories/gram, but these ultra pure phase change materials also cost several times as much as the less pure products from petroleum refining. Accordingly, because of the high cost, the ultra pure alkyl hydrocarbon phase change materials are only used in special applications which can afford the very high cost.

In order to safely transport and store temperature-sensitive materials, they must be maintained within a narrow temperature range. Medicinals such as vaccines, antibodies, etc., for example, must be maintained at temperatures above 0° C. and below 10° C., and preferably between +2 and +8° C. Phase change materials useful in the present invention include linear, crystalline alkyl hydrocarbons, or mixtures thereof, having an average carbon chain length of about 13 to 16 carbon atoms, as sold by Exxon under the trade name of Nor Par NP-15, or by Humphrey Chemical Company as technical or 98% pure tetradecane.

Preferably, the phase change material is a mixture comprising about 45 to 50% by weight of a high purity, crystalline, linear $C_{16}$ alkyl hydrocarbon, about 30 to 35% by weight of a crystalline, linear $C_{14}$ alkyl hydrocarbon, and about 15 to 25% by weight of a normal paraffin mixture having an average chain length of about 15 carbon atoms.

The combination of thermal energy storage and affordable cost stability to thermocycling, non-toxicity, commercial availability, etc., of the linear crystalline alkyl hydrocarbons from petroleum refining are not even approached on an overall basis by any other phase change material found in surveys of the published and patent literature. Desirable cost/performance properties of the linear crystalline alkyl hydrocarbon include:

High thermal energy storage (35–60 calories/gram);

Low-cost and available in large quantities;

Self-nucleating (no supercooling);

Stable to repeated thermocycling;

Non-toxic, not chemically reactive;

Non-hydrolyzable in an alkaline environment (e.g., concrete); and

Selectable melting temperatures from well below 0° C. to above 100° C.

Figure 4:
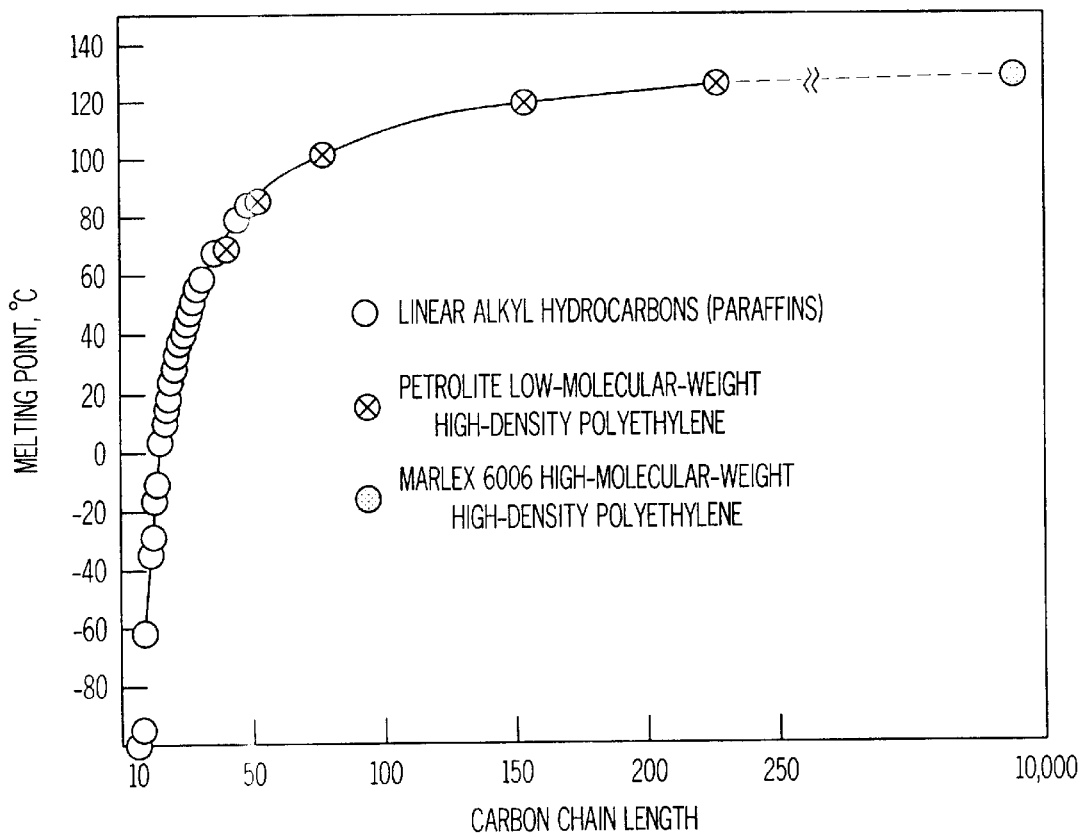
FIG. 4 is a graph showing melting temperature versus carbon chain length for commercially available phase change materials.

A graph of melting temperature versus carbon chain length for commercially available alkyl hydrocarbon phase change material is shown in FIG. 4 and illustrates the broad range of melting temperature available in these materials. This enables phase change materials to be selected that have the proper melting and freezing temperatures as needed for different applications.

The basic instrument used to guide research on phase change materials is the differential scanning calorimeter (DSC). This instrument imposes a controlled rate of heating and cooling on a small sample in a well-insulated test chamber, and compares the heat absorbed (endotherm) and emitted (exotherm) against a control. Using the DSC, one can accurately determine, independently of the surrounding environment, the important basic parameters of phase change material, including: the melting and freezing temperature; the range of temperature over which melting and freezing occurs; the rate dependence of melting and freezing; the degree of supercooling, if present; and a quantitative measure of the heat of fusion and crystallization.

The DSC tests can be run at rates of heating and cooling ranging from 100° C./minute to 0.1° C./minute, but a standard rate for phase change material screening tests is 2° C./minute. The DSC data is usually plotted as time versus heat flow of the sample, although plots of heat flow versus temperature can also be printed out by the DSC computer. The area of the endotherm and exotherm is integrated by the computer as Joules/gram. This value is converted to the more commonly used calories/gram by dividing by 4.185.

There are several problems associated with the direct use of 100% solid-to-liquid phase change material, including linear crystalline, alkyl hydrocarbon phase change materials. These problems are of such character and magnitude as to jeopardize or prevent successful use of the phase change material technology for most applications. These inherent problems include: large volume changes in melting and freezing, low viscosity in the liquid state and attendant problems of leakage, slow heat transfer rate, and adverse effects on the physical properties of the matrix. It has been found that the above problems can be eliminated or minimized if the phase change material is "contained," particularly in accordance with one of the following procedures:

(1) Containment of the 100% phase change material in "macrocapsules" or other liquid impervious enclosures such as pouches of plastic, metal or foil, or a container of glass or ceramic.

(2) Microencapsulation of phase change material in 25–250μ spheres, preferably having >90% phase change material core and <10% polymer shell.

(3) Imbibing phase change material into porous substrates at >60% by weight concentration.

(4) Permeation of phase change material into pellets of cross-linked high density polyethylene at 70% by weight.

(5) Dissolving phase change material at 60% by weight in thermoplastic compositions of phase change material/ high density polyethylene/ethylene-vinyl acetate copolymer/silica, preferably at a ratio of about 60:16:8:16.

(6) Incorporating phase change material in dry powders of phase change material/silica, preferably at a ratio of about 75:25.

(7) Incorporating phase change material in gels of phase change material/silica, preferably at a ratio of about 82:18.

In accordance with (6), preferred phase change material/ silica dry powder compositions are prepared using about 32 to 38 weight percent hexadecane, about 20 to 27 weight percent tetradecane, about 10 to 20 weight percent of a n-paraffin having an average chain length of about 15 carbon atoms, about 0.5 to 1 weight percent of an antioxidant and about 20 to 30 weight percent silica dry powder. A phase change material/silica dry powder containing about 35.6 weight percent A16, a hexadecane from Humphrey Chemical Company, 23.7 weight percent A14, a tetradecane from Humphrey Chemical Company, 14.8 weight percent NP15, a n-paraffin having an average chain length of about 15 carbon atoms, about 25.2 weight percent oven dried FK500LS, a precipitated silica from DeGussa, and about 0.7 to 1 weight percent Santowhitee, an antioxidant from Montsanto, has been found to be particularly effective in the present invention.

In accordance with (7), preferred phase change material/ silica gel compositions using about 35 to 45 weight percent hexadecane, about 20–30 weight percent tetradecane, about 15 to 20 weight percent of an n-paraffin having an average chain length of about 15 carbon atoms, about 0.5 to 1.0 weight percent antioxidant and about 15 to 20 of a pre-dried silica powder. A phase change material/silica gel containing about 39.3 weight percent A16, a hexadecane from Humphrey Chemicals Company, 26.2 weight percent A14, a tetradecane from Humphrey Chemical Company, about 16.4 weight percent NP15, an n-paraffin having an average chain length of about 15 carbons, 17.2 weight percent oven-dried FK500LS, a precipitated silica from DeGussa, and 0.8 weight percent Santowhite®, an antioxidant from Montsanto, has been found to be particularly effective in the present invention.

U.S. Pat. No. 5,106,520 to Salyer discloses a thermal energy storage material in the form of a dry powder formed from an alkyl hydrocarbon or water phase change material and silica particles. Because the phase change material/silica dry powders do not form a rigid solid, it is difficult to determine when the composition has reached a frozen state; therefore, the phase change material/silica gel composition is particularly useful in the present invention in the form of a reversible gel which means that the composition may be repeatedly frozen and thawed. Preferably, the reversible gels are enclosed in a sealed, liquid-impervious polymeric, metallized polymeric, or metal foil enclosure to form a gel pack. Such compositions are described in detail in copending application filed simultaneously herewith, the contents of which are incorporated herein by reference. The phase change material/silica gel composition useful in the present invention typically comprises about 78 to 82% by weight phase change material and about 18 to 22% by weight silica gel. Preferably, the phase change material/silica gel composition comprises about 80% by weight phase change material and about 20% by weight silica particles. The phase change material/silica dry powder composition typically comprises about 73 to 77% by weight phase change material and about 23 to 27% by weight silica, and preferably about 75% by weight phase change material and about 25% by weight silica.

Figure 5:
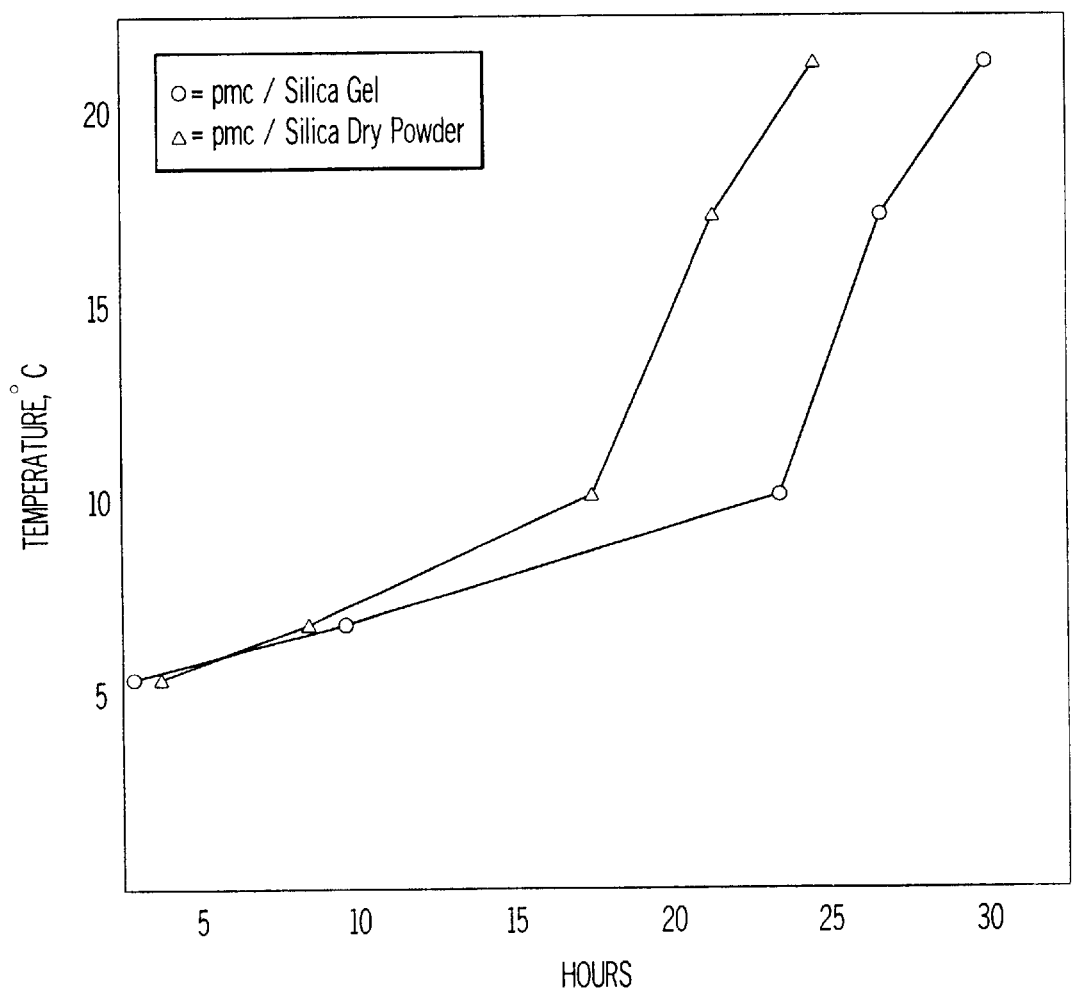
FIG. 5 is a graph showing hold time for a phase change material/silica gel and for a phase change material/dry powder.

FIG. 5 illustrates the hold time for a phase change material/silica gel as compared to the hold time for a phase change material/silica dry powder within a temperature range of about 5 to 20° C.

The phase change material/silica (about 77:23) gel has certain other advantages that cause it to be preferred for use as the phase change material in the present invention. For example: the gel will not readily leak out of the container, it contains a higher percentage of phase change material than the other methods of containment and thus has higher thermal energy storage capacity. It also has a high rate of heat transfer, and becomes hard when frozen at 5° C., and thus provides a ready indication of whether the phase change material is in the charged or discharged state.

The use of a hydrophobic silica is important in applications where the composition is exposed to water or high relative humidity as it prevents phase separation of the phase change material and the silica. A preferred hydrophobic silica has a density of about 2.2. Useful hydrophobic silica is available from PPG Industries of Pittsburgh, Pa. under the designation BXS-303. Surface treated hydrophobic formed silicas are also available from Cabot Corporation under the designations Cab-O-Sil® TS-610 and Cab-O-Sil® TS-720.

In applications where exposure to water is not a problem, lower cost hydrophilic precipitated silicas may be used. Suitable hydrophilic silicas include ABS precipitated silica from PPG, FK500LS precipitated silica from DeGussa and EH-5 silica from Cabot.

The silicas used to form the gel can be the products made by thermal decomposition of organo silanes (Cabot process); or the silicas made by precipitation from an alkaline solution of silica (precipitated silica, PPG or DeGussa). The precipitated silicas provide stable gels and are lower cost, and thus may be preferred. Either the or precipitated silica can be surface treated with silane coupling agents, or silicone resins, to make them hydrophobic. The combination of the phase change material/hydrophobic silica is preferred because it will not phase separate when exposed to liquid water or very high relative humidity.

The phase change material preferred is the high purity products that are comprised of >90% of a single carbon chain length. Because of their higher purity, these phase change materials can store and release significantly higher amounts of thermal energy than the low cost products of petroleum refining sold by EXXON under their trade name of Nor Par NP-15. However, the lower cost of Nor Par NP-15 may cause it to be used for some specific applications.

The thermal storage characteristics of Nor Par NP-15 silica gel that melts and freezes near 5° C. is shown in Table 2.

TABLE 2

DSC ANALYSIS

| Run No. | Tm (deg C) | Tc (deg C) | Tm-Tc (deg C) | Heat of Fusion (J/g) | Heat of Fusion (Cal/g) | Heat of Recrys. (J/g) | Heat of Recrys. (Cal/g) |
|---|---|---|---|---|---|---|---|
| 1 | −25.67 | −28.80 | 3.13 | 12.44 | 2.97 | 13.09 | 3.13 |
|   | 8.80 | 4.71 | 4.09 | 117.30 | 28.03 | 122.00 | 29.15 |
| 2 | −25.25 | −28.82 | 3.57 | 13.55 | 3.24 | 13.25 | 3.17 |
|   | 8.83 | 4.76 | 4.07 | 120.60 | 28.82 | 120.00 | 28.67 |
| Total | −25.46 | −28.81 | 3.35 | 13.00 | 3.11 | 13.17 | 3.15 |
|   | 8.82 | 4.74 | 4.08 | 118.95 | 28.42 | 121.00 | 28.91 |

Additionally, it may be advantageous to include, inside the filled/evacuated envelope, a getter for absorbing or adsorbing air and moisture, such as calcium oxide, barium-lithium alloy or molecular sieves having a pore size of about 4 Å to improve the R value and increase the life of the vacuum insulation. Such molecular sieves of this and other pore sizes are sold by Linde Division of Union Carbide. A source of the barium-lithium alloy is Saes Getter/U.S.A., Inc. under the name Combi-III.

For use in the invention as a source of electric power, solar photovoltaic power is preferred because of its simplicity and reliability. However, other sources of energy, such as those powered by fossil fuel; wind, e.g., windmills; and hydroenergy might be employed to advantage depending upon the location. Typical photovoltaic modules are sold by Solarex, Frederick, Md.; Uni-solar, Troy, Mich.; BP International; and Siemens. Where AC power is available, it can be used in lieu of the solar photovoltaic or other DC power sources in the system.

Several types of storage batteries can be used in the invention. Because of its ready availability and low cost, a deep cycle 12 volt lead-acid storage battery is preferred for the present system. However, higher cost alkaline batteries have advantage of longer life and thus might also be used in some cases.

A novel swing motor vapor compression unit is preferred as the refrigeration unit in the present invention. However, conventional piston, vane, or scroll compressors could be substituted in some applications. The swing motor, developed by the Sawafuji Electric Company and described in U.S. Pat. Nos. 4,632,645 and 4,706,470, the contents of which are incorporated herein by reference to the extent necessary to describe their refrigeration unit, is an electrodynamic reciprocating device that directly drives the piston of a compressor. It offers advantages such as great economy, compact size and low weight, high efficiency (due to its resonating design), and low friction losses that cumulatively result in minimum power consumption.

In accordance with the present invention, evacuation of the space between the sides of the envelope structures through an evacuation tube is desirable. The use of the evacuation tube of this invention eliminates the need for a vacuum chamber, which is both expensive and time consuming to use. To use the evacuation tube in a preferred fashion, three things are required:

(1) A method to attach an evacuation tube to the panel;
(2) A support filler provided with air paths to the evacuation tube; and
(3) A method for sealing the tube after evacuation.

The insulating support members of the present invention serve to determine the shape of the finished evacuated envelope insulation panel after the sealed flexible barrier film envelope is pressed around the support material by air pressure against the vacuum inside. The vacuum in the flexible barrier film envelope is created by forming the envelope around the panel material so as to leave a tube sized channel to the outside. A device consisting of bellows or "O" ring sealed telescoping rigid tubes is inserted into the channel and an airtight seal is achieved by drawing "O" rings or a special clamp around the outside of the channel and holding it firmly against the outer telescoping tube. The outer tube does not extend into the area of the final seal to be made on the barrier film envelope, but falls short of that by a distance sufficient to allow a seal to be made when the inner tube is withdrawn. The inner telescoping tube is placed against the filler material to prevent it becoming clogged by collapsing barrier film, and the inside of the panel is then evacuated through this tube. When the vacuum is satisfactory, the inner tube, whose end is specially shaped to avoid allowing wrinkles in the barrier film to form in its wake as it withdraws, is then pulled back far enough to clear the site of the final closing seal. The seal is then made by conventional bar sealing technique so as to overlap the original envelope perimeter seals, thus closing off the air path into the envelope and leaving no sealing tube behind.

In another aspect of the invention, a skirted tube of compatible material is attached to the film envelope and is evacuated and sealed. While the above method for evacuating the filler-containing envelope of the present invention is effective, it will be recognized by persons skilled in the art that any known or readily ascertainable method for providing an evacuation tube and for evacuating the envelope of the present invention can be used in this invention.

The combination of an impermeable, sealed film envelope, enclosing a microporous open cell silica foam, can be readily evacuated to any desired pressure. High insulation R values of 20 and greater can be obtained at pressures as high as 100 Torr, and increase to much higher values as the pressure is lowered to 0.01 Torr or less. For example, Table 3 shows that Nanogel®, a microporous, open celled, silica foam support enclosed in multi-layer composite films provides acceptable R values at much higher Torr values than microporous polystyrene encased in a multi-layer composite film.

TABLE 3

| Torr | R value[1] | R value[2] | R value[3] |
|------|----------|----------|----------|
| 1    | 50       | 48       | 23       |
| 10   | 44       | 42       | 7.6      |
| 100  | 19       | 21       | 4.5      |
| 760  | 9        | 9.5      | 4.3      |

[1] = Nanogel ™ enclosed in DuPont 153-1 multi-layer composite film envelope.
[2] = Nanogel ™ enclosed in Toyo Aluminum KK multi-layer composite film envelope.
[3] = Polystyrene enclosed in DuPont 153-1 envelope.

The pressures in the sealed vacuum panels can be maintained for extended periods in time in the sealed impermeable composite film envelopes or the barrier film envelope encasing the microporous open cell silica foam can be equipped with re-entry ports which can be used to renew the vacuum, if needed, and then resealed.

Having described preferred embodiments and aspects of the invention, it will be obvious to those skilled in the art that many variations on one or more of the individual components are possible without losing the advantages of the scope of our invention as defined in the appended claims.

What is claimed is:

1. An insulating vacuum panel having an R value per inch of 20 or greater at an evacuated pressure of at least 100 Torr, said panel comprising a microporous, open cell silica foam or a precipitated silica insulating support member enclosed within a sealed, flexible polymeric envelope, said envelope comprising a heat-sealable barrier film, said barrier film comprising a multiple layer laminate comprising at least one polyethylene terephthalate layer and at least two barrier layers selected from the group consisting of polyvinylidene chloride, polyvinyl alcohol, polyamide, polyolefin and aluminum foil; or a biaxially oriented monolithic liquid crystal barrier film wherein said enclosed insulated vacuum panel is useful as insulation to maintain an essentially constant temperature in a closed structure.

2. The insulating vacuum panel of claim 1 wherein said envelope is a heat sealable barrier film comprising a multiple layer laminate containing at least one polyethylene terephthalate layer and at least two barrier layers selected from the group consisting of polyvinylidene chloride, polyvinyl alcohol, polyamide, olefin, and aluminum.

3. The insulating vacuum panel of claim 1 wherein said envelope is a biaxially oriented monolithic liquid crystal barrier film.

4. The insulating vacuum panel of claim 3 wherein said envelope is a wholly aromatic copolyester film.

5. The insulating vacuum panel of claim 1 wherein said insulating vacuum panel is used in combination with a thermal energy storage phase change material.

6. The insulating vacuum panel of claim 5 wherein said phase change material is mixed with pre-dried silica powder to form a phase change material/silica gel composition or a phase change material/silica dry powder comoposition.

7. The insulating vacuum panel of claim 6 wherein said phase change material is a crystalline, linear, alkyl hydrocarbon or mixture thereof having an average chain length of at least 8 carbon atoms, a phase change temperature between about −100° C. and +132° C., and a thermal energy storage capacity greater than 20 calories/gram; water; water/urea; water/NaCl; water/CaO; glycol; water/glycol; $C_1$–$C_{22}$ primary alcohol; water/$C_1$–$C_{22}$ primary alcohol; organic fatty acid; fatty acid ester; or a mixture thereof.

8. The insulating vacuum panel of claim 7 wherein said phase change material is a crystalline, linear alkyl hydrocarbon or mixture thereof having a chain length of about 12 to 18 carbon atoms, a phase change temperature between 0° C. and 30° C.; and a thermal energy storage capacity of at least 20 calories/gram.

9. The insulating vacuum panel of claim 8 wherein said phase change material is a mixture comprising hexadecane, pentadecane, and tetradecane.

10. The insulating vacuum panel of claim 9 wherein said phase change material contains a mixture of n-paraffins having an average chain length of about 15 carbon atoms.

11. The insulating vacuum panel of claim 10 wherein said phase change material contains about 30 to 45 weight percent hexadecane, about 20 to 30 weight percent tetradecane, and about 10 to 20 weight percent of a mixture of n-paraffins having an average chain length of about 15 carbon atoms, about 15 to 30 weight percent pre-dried silica to form a phase change material/silica dry powder composition or a phase change material/silica gel composition.

12. The insulating vacuum panel of claim 11 wherein said phase change material further contains about 0.5 to 1.0 weight percent of an antioxidant.

13. The insulating vacuum panel of claim 12 wherein said phase change material/silica dry powder composition comprises about 35.6 weight percent hexadecane, about 23.7 weight percent tetradecane, about 14.8 weight percent of an n-paraffin having an average chain length of about 15 carbon atoms, about 0.7 weight percent antioxidant, and about 25.2 weight percent oven-dried precipitated silica, and said phase change material/silica gel composition comprises about 39.3 weight percent hexadecane, about 26.2 weight percent tetradecane, about 16.4 weight percent of an n-paraffin having an average chain length of about 15 carbon atoms, about 0.8 weight percent antioxidant, and about 17.2 weight percent oven-dried silica.

14. The insulating vacuum panel of claim 1 wherein said envelope is provided with a reentry port for re-evacuating said insulating vacuum panel.

15. The insulating vacuum panel of claim 1 wherein said envelope includes a getter for absorbing or adsorbing air and water vapor.

16. The insulating vacuum panel of claim 14 wherein said getter comprises calcium oxide, barium-lithium alloy, or a molecular sieve having an average pore diameter of about 4 to 13 Å.

17. The insulating vacuum panel of claim 1 wherein said sealed insulating vacuum panel is useful as an insulating panel in containers for storing and transporting temperature-sensitive materials, in buildings, ice storage houses, motor vehicles, boats, submarines, truck trailers, freight cars, hot water heaters, heating and cooling ducts, refrigerators, cylinders used in storing and transporting low boiling gases.

18. A system for storing and transporting temperature-sensitive materials comprising:

a container, said container including top, bottom and side insulating vacuum panels having an R value per inch of 20 or more at an evacuated pressure of at least 100 Torr, said panels defining the interior of said container, said insulating vacuum panels comprising microporous, open cell silica foam or precipitated silica insulating support members enclosed within a sealed, flexible polymeric envelope, said envelope comprising a heat sealable barrier film comprising a multiple layer laminate, said laminate containing at least one polyethylene terephthalate layer and at least two barrier layers selected from the group consisting of polyvinylidene chloride, polyvinyl alcohol, polyamide, polyolefin and aluminum foil, or a biaxially oriented monolithic liquid crystal barrier film wherein said system is capable of holding said temperature sensitive materials at a prescribed temperature for a prolonged period of time; and a thermal energy storage phase change material.

19. The system of claim 18 wherein said envelope comprises a heat sealable barrier film comprising a multiple layer laminate containing at least one polyethylene terephthalate layer and at least two barrier layers selected from the group consisting of polyvinylidene chloride, polyvinyl alcohol, polyamide, polyolefin and aluminum.

20. The system of claim 19 wherein said barrier film is a biaxially oriented monolithic liquid crystal barrier film.

21. The system of claim 20 wherein said barrier film is a wholly aromatic copolyester film.

22. The system of claim 18 wherein said phase change material is a crystalline, linear alkyl hydrocarbon or mixture thereof having a chain length of at least 8 carbon atoms, a phase change temperature between about $-100°$ C. and $+132°$ C. and a thermal energy storage capacity greater than about 20 calories/gram; water; water/urea; water/NaCl; water/CaO; glycol; water/glycol; $C_1$–$C_{22}$ alcohol; water/$C_1$–$C_{22}$ primary alcohol; organic fatty acid; fatty acid ester; or mixtures thereof.

23. The system of claim 22 wherein said phase change material is a crystalline, linear alkyl hydrocarbon or mixture thereof having a chain length of about 12 to 18 carbon atoms, a phase change temperature between $0°$ C. and $30°$ C., and a thermal energy storage capacity of at least 20 calories/gram.

24. The system of claim 23 wherein said phase change material is a mixture comprising hexadecane, pentadecane, and tetradecane.

25. The system of claim 24 wherein said phase change material further contains a mixture of n-paraffins having an average chain length of about 15 carbon atoms.

26. The system of claim 25 wherein said phase change material contains about 30 to 35 weight percent hexadecane, about 20 to 30 weight percent tetradecane, and about 10 to 20 weight percent of a mixture of n-paraffins having an average chain length of about 15 carbon atoms.

27. The system of claim 26 wherein said phase change material further contains about 0.5 to 1.0 weight percent of an antioxidant.

28. The system of claim 22 wherein said phase change material/silica dry powder composition comprises about 35.6 weight percent hexadecane, about 23.7 weight percent tetradecane, about 14.8 weight percent of an n-paraffin having an average chain length of about 15 carbon atoms, about 0.7 weight percent antioxidant, and about 25.2 weight percent precipitated silica, and said phase change material/silica gel composition comprises about 39.3 weight percent hexadecane, about 26.2 weight percent tetradecane, about 16.4 weight percent of an n-paraffin having an average chain length of about 15 carbon atoms, about 0.8 weight percent antioxidant, and about 17.2 weight percent silica.

29. The system of claim 17 wherein said system includes a getter for absorbing or adsorbing air and/or water vapor.

30. The system of claim 29 wherein said getter comprises calcium oxide, barium-lithium alloy, or a molecular sieve having an average pore diameter of about 4 to 13 Å.

31. The system of claim 17 wherein said phase change material/silica gel or said phase change material/silica dry powder is enclosed within a sealed flexible envelope comprising a barrier film, said barrier film comprising a multiple layer laminate which contains at least one polyethylene terephthalate layer and at least two barrier layers selected from the group consisting of polyvinylidene chloride, polyvinyl alcohol, polyamide, polyolefin and aluminum; or biaxially oriented, monolithic liquid crystal barrier film.

32. The system of claim 31 wherein said envelope comprises a heat sealable barrier film comprising a multiple layer laminate containing at least one polyethylene terephthalate layer and at least two barrier layers selected from the group consisting of polyvinylidene chloride, polyvinyl alcohol, polyamide, polyolefin and aluminum.

33. The system of claim 32 wherein said barrier film is a biaxially oriented monolithic liquid crystal barrier film.

34. The system of claim 33 wherein said barrier film is a wholly aromatic copolyester film.

35. The system of claim 17 wherein said phase change material is enclosed in thin wall shells of metal or plastic having a thickness of about ⅛ inch or less.

36. The system of claim 17 wherein said system additionally includes a refrigeration unit comprising a vapor compressor unit; a source of energy powered by electric energy from solar energy, fossil fuel, wind hydroenergy, fuel cells or flywheel-generated electric energy; and one or more electric storage batteries.

37. A system for storing and transporting temperature-sensitive materials, said system comprising:

(1) a portable self-sustaining refrigerator system comprising;

a container which includes top, bottom and side insulating vacuum panels having an R value per inch of 20 or greater at an evacuated pressure of at least 100 Torr, said panels defining the interior of said first container, said insulating panels comprising microporous, open cell silica foam or precipitated silica insulating support members enclosed within a sealed, flexible envelope, said sealed, flexible, polymeric envelope comprising: a heat-sealable, a multiple layer laminate which comprises at least one polyethylene terephthalate layer, at least one polyvinylidene chloride layer, at least one polyvinyl alcohol layer, and an aluminum film evaporated onto at least one layer of said at least one polyethylene terephthalate layer, or said heat-sealable, multiple layer laminate comprises at least one nylon layer, at least one polyethylene terephthalate layer, at least one aluminum foil layer and at least one high density polyethylene layer, or said envelope comprises a biaxially oriented monolithic liquid crystal barrier film, said envelope further containing a getter comprising calcium oxide, barium-lithium alloy, or a molecular sieve having a pore diameter of about 4 to 13 Å wherein said first container is capable of holding said temperature-sensitive material at a prescribed temperature for a prolonged period of time;

a solar powered source of electrical energy;

one or more 12-volt, deep cycle batteries for storing said electrical energy;

a vapor compressor refrigeration unit;

a thermal energy storage phase change material/silica gel composition comprising a mixture of about 35 to 45 weight percent hexadecane, about 20 to 30 weight percent tetradecane, about 15 to 20 weight percent of an n-paraffin having an average chain length of about 15 carbon atoms, about 0.8 to 1.0 weight percent of an antioxidant, and about 15 to 20 weight percent of a pre-dried silica powder to form a reversible phase change material/silica gel, wherein said reversible phase change material/silica gel is enclosed in a heat-sealed flexible polymeric envelope, said envelope comprising a multiple layer laminate which comprises at least one polyethylene terephthalate layer, at least one polyvinylidene chloride layer, at least one polyvinyl alcohol layer, and at least one aluminum film evaporated onto at least one surface of said at least one polyethylene terephthalate layer, or said multiple layer laminate comprises a heat sealable, multiple layer laminate which comprises at least one nylon layer, at least one polyethylene terephthalate layer, at least one aluminum foil layer and at least one high density polyethylene layer, or said envelope comprises a biaxially oriented monolithic liquid crystal barrier layer; and (2) at least one portable, light weight, insulated container comprising, a housing which includes top, bottom and side insulating panels having an R value per inch of 20 or greater at an evacuated pressure of at least 100 Torr, said panels defining the interior of said housing, said insulating panels comprising microporous, open cell silica foam or precipitated silica insulating support members enclosed within a sealed, flexible polymeric envelope, said sealed, flexible polymeric envelope comprising a heat-sealable multiple layer laminate which comprises at least one polyethylene terephthalate layer, at least one polyvinylidene chloride layer, at least one polyvinyl alcohol layer and an aluminum film evaporated onto at least one layer of said at least one polyethylene terephthalate layer, or said multiple layer laminate comprises at least one nylon layer, at least one polyethylene terephthalate layer, at least one aluminum foil layer and at least one high density polyethylene layer, or said envelope comprises a biaxially oriented monolithic liquid crystal barrier film, said envelope further containing a getter comprising a molecular sieve having a pore diameter of about 4 to 13 Å wherein said insulated container is capable of holding said temperature-sensitive material at a prescribed temperature for a prolonged period of time; and a thermal energy storage phase change material comprising a mixture of about 35 to 45 weight percent hexadecane, about 20 to 30 weight percent tetradecane, about 15 to 20 weight percent of an n-paraffin having an average chain length of about 15 carbon atoms, about 0.5 to 1.0 weight percent of an antioxidant, and about 15 to 20 weight percent of a pre-dried silica powder to form a reversible phase change material/silica gel, wherein said reversible phase change material/silica gel is enclosed in a heat-sealed flexible polymeric envelope comprising a multiple layer laminate which comprises at least one polyethylene terephthalate layer, at least one polyvinylidene chloride, at least one polyvinyl alcohol layer, and at least one aluminum film evaporated onto at least one surface of said at least one polyethylene terephthalate layer, or said multiple layer laminate comprises a heat-sealable, multiple layer laminate which comprises at least one nylon layer, at least one polyethylene terephthalate layer, at least one aluminum foil layer, and at least one high density polyethylene layer wherein said portable, light weight, insulated container is useful to transport said temperature sensitive material to a location remote from said portable, self-sustaining refrigerator system.

38. The system of claim 18 wherein said container is a box or pouch for storage and transport of heat sensitive products at temperatures from −100° C. to +132° C.

39. The system of claim 38 wherein said container is a box or pouch for cold storage and transport of food products at a temperature from about −55° C. to 0° C.

40. The system of claim 38 wherein said container is a box or pouch for hot storage and transport of food products at a temperature from about 30° C. to 100° C.

41. A method for manufacturing an insulating vacuum panel comprising the steps of:

(a) providing a microporous, open cell silica foam or precipitated silica support member;

(b) drying the microporous, open cell silica foam or precipitated silica support member;

(c) enclosing the microporous, open cell silica foam or precipitated silica support member in a flexible, heat-sealable multiple layer composite film comprised of at least one polyethylene terephthalate layer and at least two barrier layers selected from the group consisting of polyvinylidene chloride, polyvinyl alcohol, polyamide, polyolefin and aluminum foil, or a biaxially oriented monolithic liquid crystal barrier film;

(d) providing a sealable port through which the enclosed insulating, support containing vacuum panel is evacuated;

(e) evacuating the enclosed insulating, support-containing vacuum panel; and (f) heat sealing the enclosed insulating support-containing panel.

* * * * *